United States Patent [19]

Layman et al.

[11] Patent Number: 5,388,198
[45] Date of Patent: Feb. 7, 1995

[54] PROACTIVE PRESENTATION OF AUTOMATING FEATURES TO A COMPUTER USER

[75] Inventors: Andrew J. Layman, Mill Valley; David C. Berkovec, Santa Rosa, both of Calif.

[73] Assignee: Symantec Corporation, Cupertino, Calif.

[21] Appl. No.: 870,616

[22] Filed: Apr. 16, 1992

[51] Int. Cl.⁶ ............................................. G06F 15/62
[52] U.S. Cl. ................................................... 395/155
[58] Field of Search ............................... 395/155–161, 395/800; 345/121–123; 364/221.7, 221.3

[56] References Cited

U.S. PATENT DOCUMENTS

| | | | |
|---|---|---|---|
| 4,648,062 | 3/1987 | Johnson et al. | 395/157 |
| 4,789,962 | 12/1988 | Berry et al. | 395/157 |
| 4,899,276 | 2/1990 | Stadler | 395/161 |
| 4,964,077 | 10/1990 | Eisen et al. | 395/161 |
| 5,029,113 | 7/1991 | Miyoshi | 395/161 X |
| 5,040,131 | 8/1991 | Torres | 395/159 |
| 5,157,768 | 10/1992 | Hoeber et al. | 395/157 |
| 5,287,448 | 2/1994 | Nicol et al. | 395/159 |

FOREIGN PATENT DOCUMENTS 0401975 12/1990 European Pat. Off. ........ G06F 9/44

OTHER PUBLICATIONS

The Worksheet Utilities, Funk Software, 1987, pp. 10–12, 14–20, 48–61.
Macintosh System Software User's Guide, V.6.0, Apple Corp., 1988, pp. 14–43, 148–150.
B. A. Goodman, Diane J. Litman, "Plan Recognition for Intelligent Interfaces", CAIA Proceedings, the 6th Conference on Artificial Intelligence Applications, Mar. 5, 1990, Santa Barbara, Calif., pp. 297–303.
Jeffery J. P. Tsai and Owen S. Chan, "ISE: A User Modeling Based Software Development System", Proceedings Compsac 87, the 11th Annual International Computer Software & Applications Conference, Oct. 7, 1987, Tokyo, Japan, pp. 141–147.

Primary Examiner—Mark R. Powell
Assistant Examiner—John E. Breene
Attorney, Agent, or Firm—Greg T. Sueoka; Leo V. Novakoski; Edward J. Radlo

[57] ABSTRACT

A system for proactively automating the use of a computer comprises a central processing unit (CPU), an input device, a display device and memory including a set of feature templates, context monitoring unit, input monitoring unit, feature presentation routines and feature implementation routines. The CPU is coupled to the display device and input devices for displaying information and receiving information, respectively. The CPU is also coupled to the input monitoring unit and the context monitoring unit to detect and record user manipulations of the input device and its context. The CPU is also coupled to a section of memory containing feature templates. Each template is a set of input manipulation steps and program contexts. The CPU compares the recorded user manipulations of the input and their corresponding program context with the feature templates stored in memory. If a match is found, the CPU uses the feature presentation routines to present different features on the display to the user and implements the features with the feature implementation routines according to user selection.

13 Claims, 6 Drawing Sheets

|   | A | B | C | D | E | F | G |
|---|---|---|---|---|---|---|---|
| 1 |   |   |   |   |   |   |   |
| 2 |   | 4 | 6 | 34 | 396 | ///  |   |
| 3 |   | 52 | 26 | 43 | 198 |   |   |
| 4 |   | 72 | 23 | 68 | 423 |   |   |
| 5 |   | 30 | 92 | 37 | 234 |   |   |
| 6 |   | 69 | 18 | 27 | 643 |   |   |
| 7 |   | 12 | 54 | 39 | 735 |   |   |
| 8 |   | /// |   |   |   |   |   |
| 9 |   |   |   |   |   |   |   |
| 10 |   |   |   |   |   |   |   |
| 11 |   |   |   |   |   |   |   |
| 12 |   |   |   |   |   |   |   |
| 13 |   |   |   |   |   |   |   |
| 14 |   |   |   |   |   |   |   |
| 15 |   |   |   |   |   |   |   |

FIG. 6

PROACTIVE PRESENTATION OF AUTOMATING FEATURES TO A COMPUTER USER

BACKGROUND OF THE INVENTION

1. Field Of the Invention

The present invention relates generally to computers. In particular, the present invention relates to a system and method for monitoring the use of a computer, and presenting and executing operations or features that will automate the use of the computer.

2. Description of the Related Art.

Conventional computer systems and application programs often include a help system in one form or another. Such help systems are designed to provide the user with information about the operation and features of the computer system. Some computer systems and applications even include on-line help which can be accessed during operation of the computer system and applications. One problem with the help systems presently available is that they must be initiated by the user. This presents problems because the user must typically identify the operation, command or feature for which help or additional information is needed. In many cases, the user knows very little about the operation and that is why help is sought. Moreover, help systems typically provide little more than an explanation of the appropriate syntax for features or operations and their function. Most help systems do not explain the appropriate context for the use of the system's features.

Many systems and application programs also include tutorial programs. Most tutorial programs are step by step demonstrations of the features of the system or program. The tutorial programs operate independently of the application, and therefore, cannot be operated simultaneously with the application. Some tutorial programs require user interaction which is for the most part limited to the selection of a topic for which assistance or additional information is required. Therefore, tutorial programs do not provide any automation for implementing features of an application program.

Similarly, assistance programs are used with many application programs. For example, assistance programs that operate as translators are often included in data base applications. Such assistance programs have been developed that translate data base commands in ordinary English to the specific language used by the computer. While these assistant programs have removed the necessity of knowing the specific syntax or command required to use an application program in the most effective manner, assistance programs still require that the user know the goal or result that the user would like to achieve. Most assistance programs require that the user have a general understanding of the features or operations performed by a program before using it. Thus, they do not provide full automation or a demonstration of the context for use of the application's features.

Therefore, there is need for a system and method for proactively automating the use of application programs and computers. In particular, there is a need for a system and method for presenting results or goals, through the presentation of features, to user based on the user's input. There is also a need for a system that gives the user an opportunity to learn the features of the program as well as reducing the start up time for new application programs.

SUMMARY OF THE INVENTION

The present invention overcomes the deficiencies of the prior art with a system and method for proactively automating the use of a computer and existing application programs. Basically, the present invention is a system and method for continuously monitoring the use of a computer system by a user. In particular, the system of the present invention monitors the user's manipulation of the input devices. Then the system automatically intervenes to suggest or present features that may automate use of the computer system based on the user's manipulation of the input devices.

The present invention preferably comprises a central processing unit (CPU), an input device, a display device and memory. The memory preferably includes a set of feature templates, context monitoring means, input monitoring means, feature presentation routines, feature implementation routines as well as other application programs and routines. The CPU is coupled to the display device, the input devices and memory. The user inputs data into the system using the input device, and receives information from the CPU using the display device. The CPU is coupled to and uses memory, in particular, the input monitoring means, to detect and record any manipulations of the input device by the user. Similarly, the CPU uses the context monitoring means to identify and record an associated context for each manipulation of the input device. The CPU is also coupled to a section of memory containing feature templates. Each template is a set of input manipulation steps and program contexts that can be automated by using an existing feature in the application program. The CPU compares the recorded user manipulations of the input device and their corresponding program context with the feature templates stored in memory. If a match is found, the CPU uses the feature presentation routines to present different features or function to the user, and implements the features with the feature implementation routines according the response of the user. The CPU performs these steps concurrently with the operation of other applications and programs.

The methods of the present invention preferably comprises a method for automating the use of existing features in an application program, and a method for checking for ambiguities and conflicts while the application program is operational. The method of automating use of the application program preferably comprises the steps of: monitoring the use of the input device, monitoring the context of the application program in which the manipulation of the input device occurred, and comparing the context and the use of the input device to a set of templates corresponding to existing features provided by the application program. The templates are lists of direct manipulation steps that can be more efficiently performed by using an existing feature of the application program to reach the same result. If there is no match, the preferred method returns to the first monitoring step. If a match is found, then the automating feature is presented on the display, the user inputs a selection and then the user input is replaced with the automating feature according to the selection by the user. The method for checking for ambiguities and conflicts operates in a similar manner with the conflict presented to the user instead of the automating feature, and then user is required to select between conflicting inputs.

DESCRIPTION OF THE PREFERRED EMBODIMENTS

Figure 1:
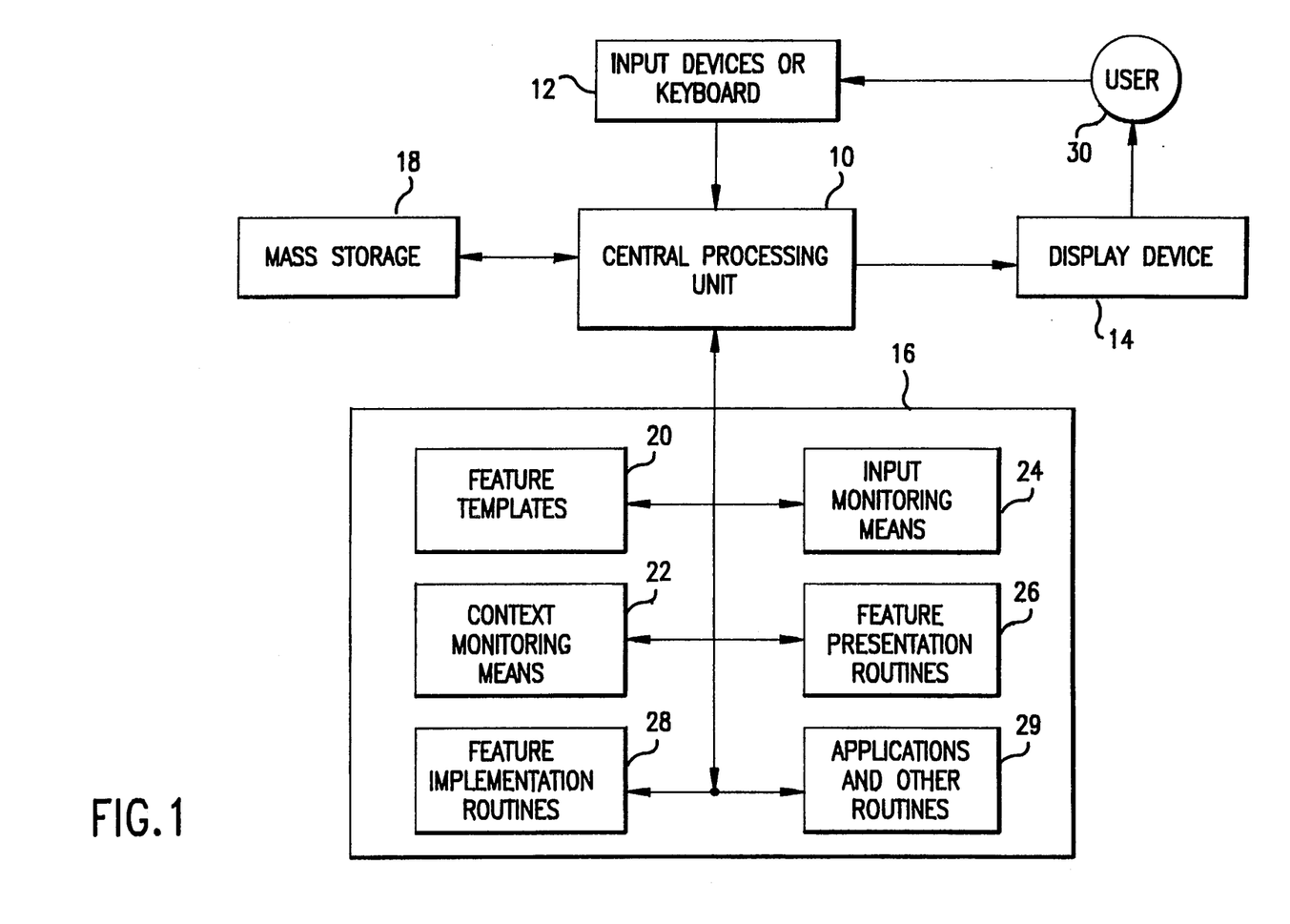
FIG. 1 illustrates a block diagram of a preferred embodiment of the system of the present invention.

Referring now to FIG. 1, a preferred embodiment of the system of the present invention is shown. The preferred system comprises a central processing unit (CPU) 10, an input device 12, a display device 14, an addressable memory means 16 and mass storage 18. The CPU 10 is coupled to and controls the display device 14 to produce a variety of images in response to inputs supplied to the CPU 10 by user manipulation of the input device 12. The CPU 10 is also coupled to other sources of information such as mass storage 18 and addressable memory 16 in a conventional architecture. In an exemplary embodiment, the CPU 10 may be a microprocessor from the 'X86 family produced by Intel or the 68000 family produced by Motorola.

The input device 12 is a conventional type as known in the art. The input device 12 is preferably a keyboard with a "mouse" type controller. For example, the input device 12 may include a mouse or track ball. A mouse is a small device with one or more pushbuttons that can be rolled on a flat surface. A pointer or mouse cursor is produced on the display device 14 to represent the position of the mouse. Moving the mouse on the flat surface causes corresponding movement of the mouse cursor on the display device 14. By moving the mouse, a user 30 can point to different objects shown on the display device 14. Once pointed to, an object can be manipulated by pressing the button on the mouse or entering a command via the keyboard.

The display device 14 is also a conventional type known in the art. The display device 14 is preferably a raster-type display used with the CPU 10 in a conventional manner to produce images of characters generated from codes such as ASCII in text mode. The CPU 10 may also create images on the display device 14 in other conventional ways such as producing an image from a group of dots or pixels in graphics mode as in the Windows environment by Microsoft. The display device 14 also operates in a conventional manner with the input device 12 to produce a cursor on the display device 14 that indicates the location where data will be input or the object on the display device 14 that will be manipulated.

The addressable memory 16 is a conventional type and preferably includes Random access Memory (RAM) and Read Only Memory (ROM). The addressable memory 16 further comprises processing routines, programs and data for interactive display control and proactive automation as the user 30 runs application programs and uses the system. For example, the memory 16 includes input device interrupt routines and drivers. The memory 16 includes routines for transferring data from the CPU 10 to the display device 14 and for presentation of the data on the display device 14. The memory 16 further includes other routines and application programs 29 as conventional in the art.

More particularly, the memory means 16 of the present invention further comprises a set of feature templates 20, input monitoring means 24, context monitoring means 22, feature presentation routines 26 and feature implementation routines 28. The feature templates 20 are sequences of specific user manipulations of the input device 12. For example, one template may be a particular series of keystrokes and then a clicking of the mouse button. In the preferred embodiment, there are several templates, each corresponding to a series of direct manipulations of the input device 12 that achieve a result than can more effectively and generally be accomplished using a existing feature or function provided by the application program. The templates 20 are used to identify instances when the user 30 is performing a task through manipulation of the input device 12 which could be accomplished more easily and generally by implementing a feature or command already provided by the application program as will be discussed in more detail below.

The memory 16 also comprises the input monitoring means 24. The input monitoring means 24 identifies and records any user manipulation of the input device 12. For example, the input monitoring means 24 identifies the key(s) depressed if the keyboard was used, or identifies the position of the mouse (its beginning position and ending position) and the instances when the mouse buttons were depressed if the mouse was manipulated. In the preferred embodiment, the input monitoring means 24 is a routine executed by the CPU 10. However, it should be understood to those skilled in the art the input monitoring means 24 may be a hardware device coupled between the input device 12 and the CPU 10.

The memory 16 also includes the context monitoring means 22. The context monitoring means 22 identifies and records the context in which the user 30 manipulated the input device 12. More specifically, the context monitoring means 22 identifies state or level the application program was in when the input device 12 was used. For example, if the system of the present invention is operating in the Windows environment, the mouse button was depressed and the mouse was moved; such user manipulation of the mouse could have a variety of meanings depending on the context or state of the application. The meaning of such a manipulation is dependent on both the position of the mouse cursor on the display 14 and the state of the application. The context monitoring means 22 advantageously identifies the context such as the menus that were activated, the position of the mouse, the windows that were open, etc.; and stores this context in memory. The context monitoring means 22 is preferably a routine that is executed by the CPU 10 to fully identify the context in which the user 30 manipulated the input device 12.

Finally, the memory 16 also includes feature presentation routines 26 and feature implementation routines 28. For each feature template 20, there is a corresponding feature presentation routine 26. The feature presentation routines 26 are used to present the feature or command that can be used in place of the user's manipulation of the input device 12 to provide the same effect with more generality. The feature presentation routines 26 preferably present on the display device 14, the option of implementing the feature, making no change or making other logical changes. The routines 26 preferably present the several options on the display device 14 using a dialog box or similar menu type device for easy user selection. Once the user 30 has made a selection, the feature implementation routines 28 are then used to effect the desired result. If the user 30 decides not to implement any of the features or functions suggested, then the feature implementation routines 28 do nothing and return the system and method to the state of monitoring the input device 12 for use. However, if the user 30 wants to implement a feature, the feature implementation routines 28 must effectively undo the effects of the manipulation of the input device 12 that matched the feature template 20, and apply the feature in a more automated manner. It should be understood that depending on the feature, the feature implementation routines 28 may not have to undo any previous steps, but may merely act directly on the program and data in its current status.

Figure 2:
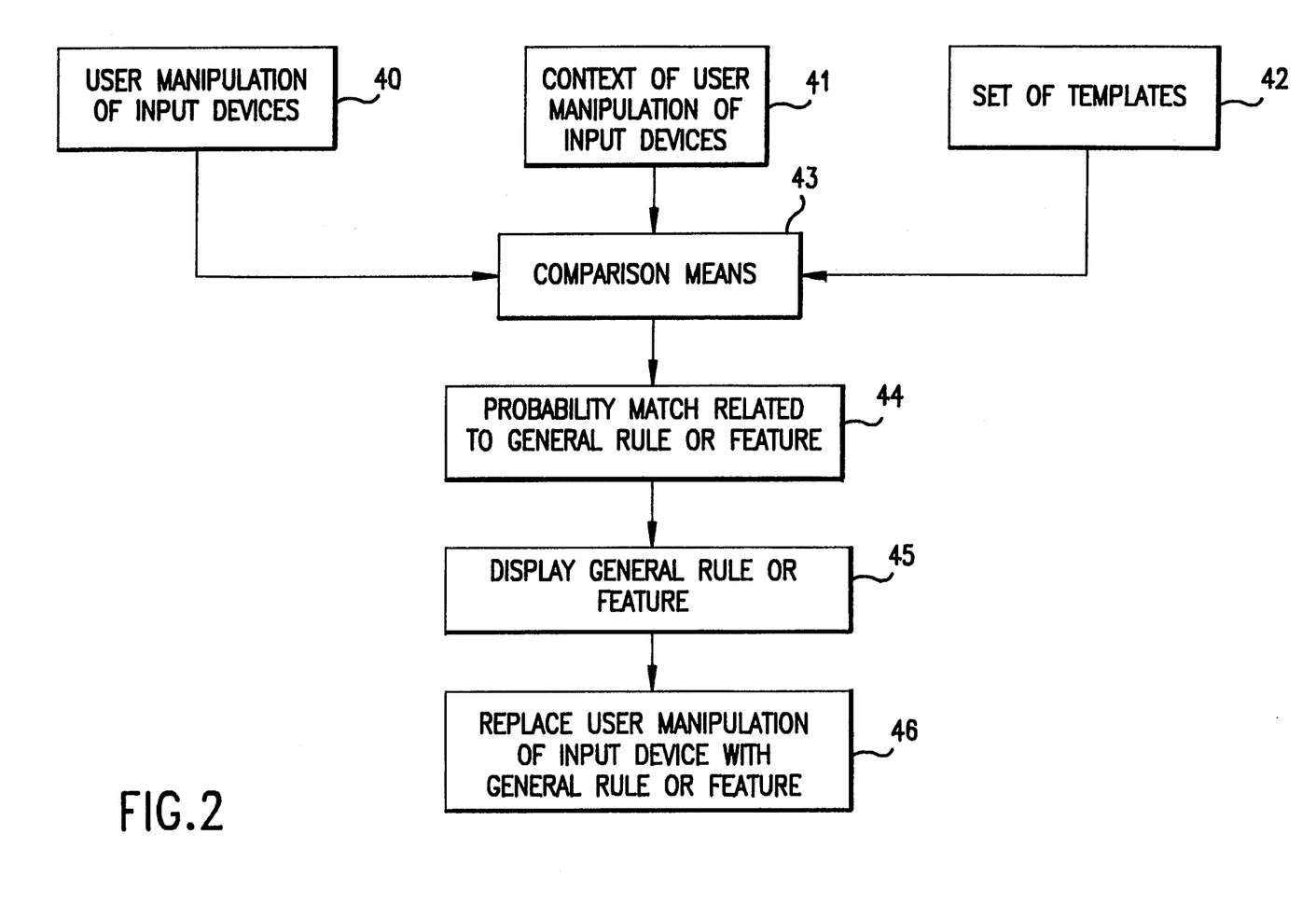
FIG. 2 is general block diagram showing operation of the method of present invention.

Referring now to FIG. 2, an overview of the present invention is described. As shown in FIG. 2, the present invention receives input in the form of user manipulation of the input device 12 in block 40, the context of the manipulation in block 41 and a set of templates 22 specific to the application program being executed by the system in block 42. This information is then compared by the CPU 10 in block 43. Any templates 20 that match the user manipulation and the context are identified in block 43 and sent to block 44. In block 44, the CPU 10 determines which features or general rules are the most likely (most probable) to have the same effect as the actual manipulation of the input device 12 by the user 30. The CPU 10 prioritize particular features if there are multiple matching templates received from block 43. Then, the feature with the highest priority is presented to the user 30 by displaying an inquiry as to whether the user 30 would like to use the feature in block 45. Finally, in block 46, the CPU 10 replaces the user manipulation with the feature or general rule if the user 30 so desires. The present invention is particularly advantageous because it significantly reduces the start up and learning period for new application programs because the user 30 learns new features as they are suggested by the present invention in an useable context. Moreover, the present invention also provides a safety net or double check so the user 30 knows that the optimum features and capabilities of a particular application program are utilized.

Figure 3:
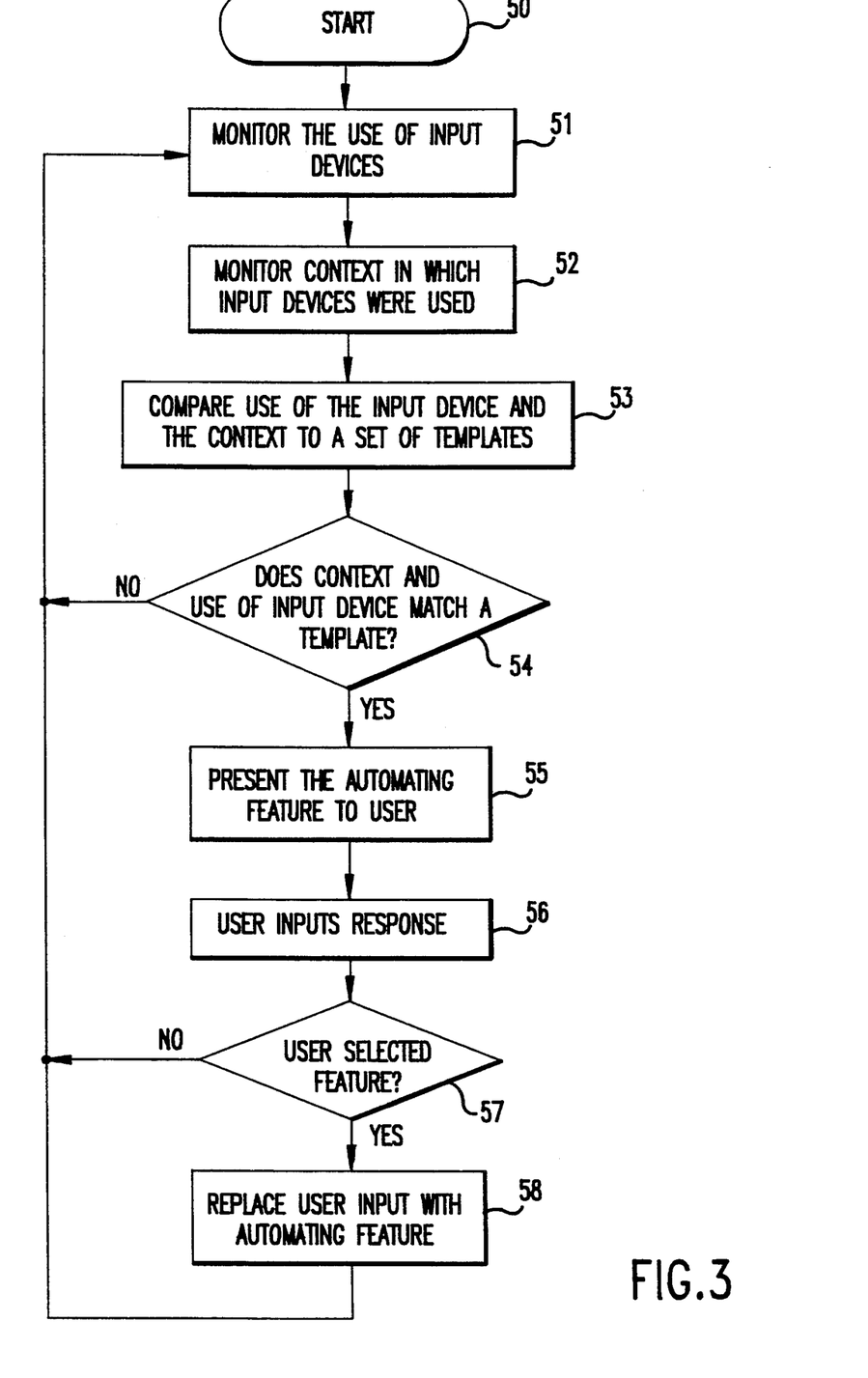
FIG. 3 is a flowchart of a preferred embodiment for the method of automating the use of a computer of the present invention.

Referring now to FIG. 3, a preferred embodiment of the method of the present invention for simplifying and automating the use of an application program is shown. The method begins in step 51 by monitoring the use of the input device 12. The present invention preferably monitors the input device 12 continuously for any direct manipulation by the user 30. It should be understood that those skilled in the art may monitor for either a single direct manipulation of the input device 12, or a series of direct manipulations of the input device 12. In step 52, the preferred method also monitors the context in which the input device 12 is manipulated. Steps 51 and 52 preferably include the recording of any direct manipulation and its context for use in the comparison of step 53. Next, in step 53, the direct manipulation and its context are compared to templates 20 of direct manipulation steps and associated contexts. The templates 20 are designed to identify direct manipulation steps that can be automated by features or commands already provided in the application program. In step 54, the method tests whether the monitored context and direct manipulation match a template. If there is no match with any of the templates in step 54, then the method returns to step 51 to monitor for further direct manipulation of the input device 12. However, if there is a match between a template and the direct manipulation detected in step 51, the method proceeds to step 55 where the feature presentation routines 26 are used to display one or more automating features to the user 30. The automating features are features or commands existing in the application that would have the same effect, but with greater generality or persistence. Step 55 preferably displays the automating feature in the form of an inquiry in a dialog box. In addition to the implementation of the feature, other logically related features or commands may also be presented. For example, if there is a match with several templates, the present invention displays several features for the user 30 to choose from. Then in step 56, the user 30 inputs a response to the presentation of the automating feature displayed in step 55. The response input by the user 30 in step 56 may be the selection of any features presented in step 55. In such a case, the user 30 has decided to implement the feature corresponding to the selection and the method continues in step 58. Alternatively, the user's response may be to disregard the information presented in step 55 and continue with direct manipulation of the input device 12, or enter the cancel command. Thus, the implementation of the feature is entirely at the discretion of the user 30 and will only be implemented if the user 30 responds affirmatively. Moreover, if the feature is not what the user 30 intended or desires, then the user 30 will be only temporarily distracted by presentation step 55 after which manipulation of the input device 12 continues at the same point before the interruption. In step 57, the preferred method determines whether the user 30 wants to implement the automating feature. If the user 30 does not want to implement the automating feature, then the method returns to step 51 and continuously monitors for further direct manipulation of the input device 12. The user 30 may then continue the series of direct manipulations of the input device 12. On the other hand, if user 30 chooses to implement the automating feature, the direct manipulation detected in step 51 that matches the template 20 is undone, and replaced with the automating feature to effect the same result.

Figure 4:
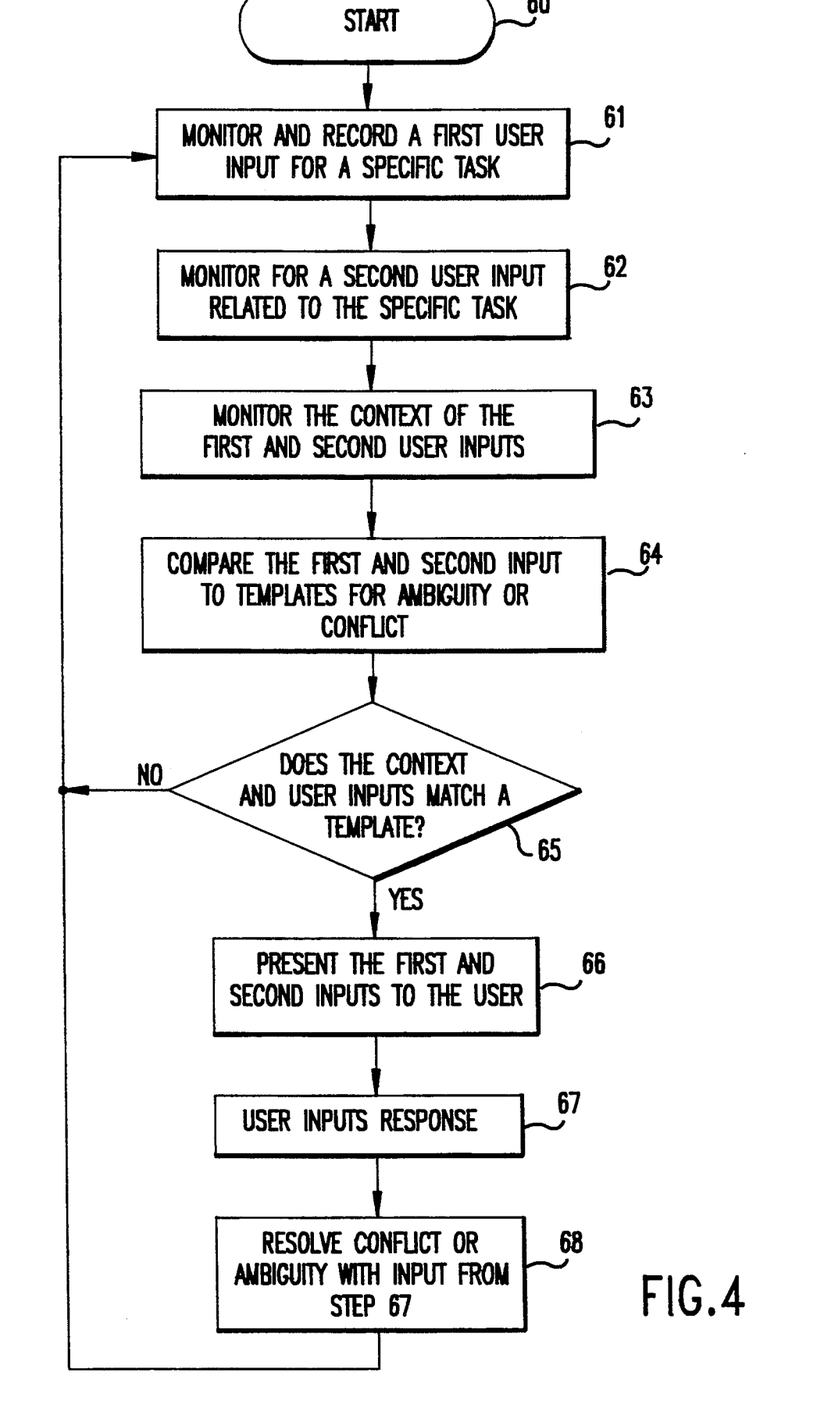
FIG. 4 is a flowchart of a preferred embodiment for the method of resolving ambiguous and conflicting information of the present invention.

Referring now to FIG. 4, a preferred embodiment of the method for checking for ambiguities and conflicts in accordance with the present invention is shown. The method begins in step 61 by monitoring and recording the first use and context of the input device 12 related to a particular task or object. Then in step 62, the present invention monitors for a second use of the input device 12 related to the same task or object. In step 63, the context of the second direct manipulation of the input device 12 is monitored and recorded. Next, in step 64, the first and second direct manipulations and their contexts are compared to templates 20 of direct manipulation steps and associated contexts. In this case, the templates 20 are designed to identify direct manipulation steps that are inconsistent or ambiguous. In step 65, the method tests whether the context and direct manipulations match a template. If there is no match with any of the templates in step 65, then the method returns to step 61 to monitor for further conflicts in the direct manipulation of the input device 12. However, if a match between a template, and the first and second uses of the input device 12 is found in step 65, the method proceeds to step 66 where the feature presentation routines 26 are used to display the first and second conflicting inputs to the user 30. The user 30 is also asked to select which of the first and second inputs is desired, or may leave the conflict unresolved by not responding. In step 67, the user 30 inputs a response, if any, as to how the conflict or ambiguity is to be resolved. In step 68, the preferred method resolves any conflict or ambiguity by using the response of the user 30 from step 67. Similar to the method of FIG. 3, the user 30 may do nothing in step 67 and continue with manipulation of the input device 12 in which case the conflict will remain unresolved. The user 30 may also confirm that either the first input or the second input is correct by responding to the dialog box displayed in step 66. Finally, the user 30 may also hit the escape or cancel key to remove the display of the conflicting entries and return to the application program. Then the method returns to step 61 and continuously monitors for other conflicting information or actions of the user 30.

Figure 5:
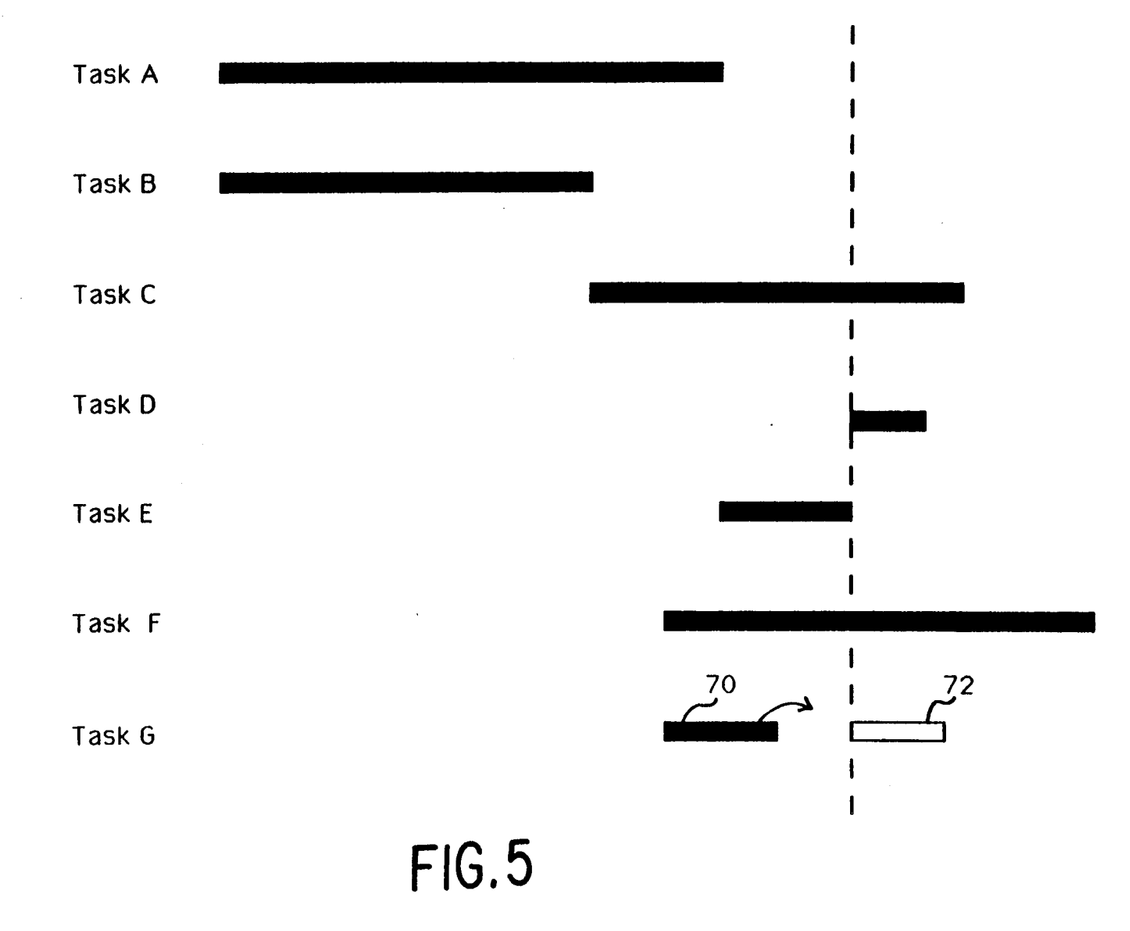
FIG. 5 is the display device showing an project management program to illustrate the method of the present invention.

Referring now to FIG. 5, an example of the operation of the system and method of the present invention will be demonstrated in the terms of a project management application program. FIG. 5 illustrates the display device 14 with a series of tasks (A–G) to be scheduled as presented by the application program. Assuming that task G is a task that is to be performed as soon as possible, and there is a template (general rule) that if a task is dragged or moved (i.e., rescheduling a task) and the start date of the task lines up near the end date of other tasks, the user 30 may be dragging or moving the task because the start date of the task really requires completion of the one or more of the other tasks. The template corresponds to the dependency feature of the application program which allows the user 30 to set a particular task as being dependent on other tasks. With this feature, the application automatically reschedules the dependent task to start at the end of the independent task whenever the independent task's ending date changes. With the present invention in operation, the user 30 is automatically prompted to set a dependency if task G is moved from the first position 70 to a second position 72. More specifically, the present invention continuously monitors the input device 12 for a direct manipulation of dragging a task for repositioning and a context where the task is repositioned with its start date near the ending date of another task. The user's action of moving the bar for task G from the first position 70 to the second position 72 is monitored and recorded. As can be seen when task G is in the second position, its start date is near the end date of task E. Next, the direct manipulation and context are compared with the set of templates and found to match the template described above. Therefore, in accordance with the present invention as shown in FIG. 3, a dialog box will be presented on the display 14 asking the user 30 if task G is dependent on task E. The user 30 then inputs a selection and the present invention effects the dependency according to the selection of the user 30. Similarly, a second template may be provided that specifies if a task is moved and the new location of the task has a start date about the same as the start date of another task, the user 30 may want to set the two tasks to begin at the same time. With this second template, the direct manipulation of moving task bar G from the first position 70 to the second position 72 would result in a match with the second template. Movement of the task bar matches the direct manipulation and the second position 72 of task G matches the context because task G's start date is near that of task D. Then, the user 30 would be prompted as to whether the task D and task G should start at the same time. The present invention then creates a relationship between task D and G according input from the user 30.

Figure 6:
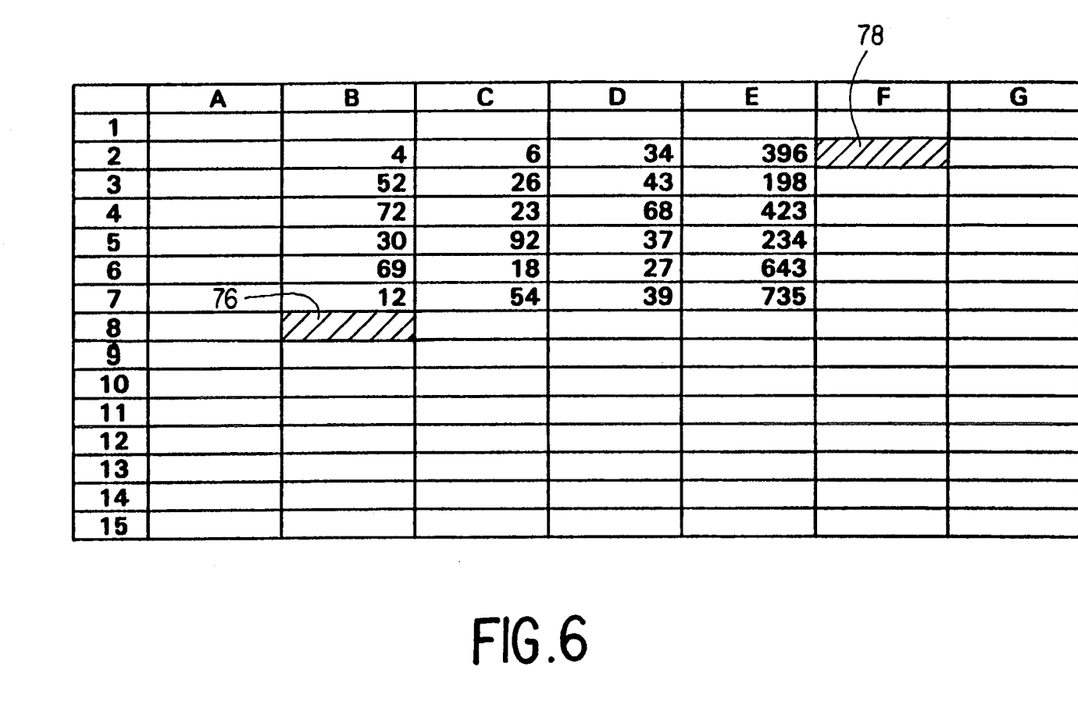
FIG. 6 is the display device showing an spreadsheet program to illustrate the method of the present invention.

Those skilled in the art will realize that the present invention may be used with a variety of application programs to implement any number of features. In addition to project management programs, the present invention may be particularly useful with spreadsheet programs as shown by FIG. 6. FIG. 6 shows a conventional spreadsheet. The present invention may be used with such a spreadsheet to automate use of the features already provided by the spreadsheet. For example, one feature that automates operation of the spreadsheet is the "@sum" feature/function. The @sum function provides the sum of a block of contiguous cells in a row or column. This feature eliminates the need to enter a formula to produce the sum of a row or a column. The present invention can proactively and continuously monitor for instances were the @sum function should be used. For example, a first template may be provided for when the user 30 begins to enter a formula for an addition operation on a group of cells that are in row or column (i.e., B7+B6+ . . . ). Thus, once the user 30 positions the cursor 76 at cell B8 as shown and enters the string "B7+B8+", the system and method of the present invention will find a match with the first template and prompt the user 30 as to whether the @sum function should be used in cell B8 to sum cells B2 through B7. Similarly, a second template for the @sum function would be provided to handle the case where the user 30 constructs the formula for the sum by direct manipulation of the cursor 76. Rather than entering a formula, the user 30 may sum the cells in column B by positioning the cursor at cell B8, entering the "+" key, moving the cursor to cell B7, entering the "+" key, moving the cursor to cell B6, entering the "+" key, etc. A template may be constructed to recognize the first two positioning and entering steps. If there is a match between the user manipulation of the input device 12, and the context (i.e., the cells being in a single column or row) then the system of the present invention presents the option of using the @sum function at the initial cursor position, cell B8 76. Similarly, two additional templates are constructed to automate each method of summing a row of cells such as B2 through E2 at cell F2 78. Thus, one embodiment of the present invention may have as many as four templates to recognize instances were the @sum function should be employed to automate the use of the spreadsheet program. However, it should be understood that the four templates may also be a single template of greater generality that matches use of the "+" key in the context of cells in a single row or column. By analogy additional templates may be created for the numerous other features already included in spreadsheets such as, but not limited to, minimum, maximum, and other arithmetic functions.

While the present invention has been described with reference to preferred embodiments, those skilled in the art will recognize that various modifications may be provided. The present invention may be adapted to a variety of computer systems that have predefined features or operations which the user 30 may perform. For example, the present invention may be applied to proactively provide implementation of outlining capabilities in a word processing program. The templates would be formed by combinations of letters, numerals periods and indentations. In an exemplary embodiment, as the user 30 types in "I." and then subsequently a tab and "A.", this input is compared with the set of templates. After a predefined level of outlining that matches a template, the user 30 may be prompted as to whether he would like to use the outlining feature of the word processing program in which the outline levels are automatically delineated after a carriage return depending on the number of indentations input. These and other variations upon and modifications to the described embodiments are provided for by the present invention, the scope of which is limited only by the following claims.

What is claimed is:

1. A system for proactively automating an operation of a general purpose computer having a central processing unit (CPU), a display device, an input device and memory with application programs and routines by automatically intervening in a user's manipulations of the input device to present automating features, the system comprising:
   an input monitoring means coupled to the CPU and the input device for continuously detecting and recording the user's manipulations of the input device to achieve a desired result;
   a context monitoring means coupled to the CPU for continuously detecting and recording a state of an application program during the user's manipulation of the input device;
   a plurality of feature templates, each feature template including input information representing manipulations of the input device and a state of the application, program for identifying the desired result;
   wherein said memory further comprises feature presentation routines corresponding to each feature template, for controlling the CPU to display automating features on the display device that achieve a result having greater generality or persistence than the identified desired result.

2. The system of claim 1, wherein said memory further comprises feature implementation routines for controlling the CPU to modify the state of the application program and implement an automating feature of the application program when selected by the user.

3. The system of claim 1, wherein the CPU compares the detected state and manipulations recorded by the context monitoring means and the input monitoring means, respectively, to the input information included in the plurality of feature templates, and if the detected state and manipulations match the input information of one of the plurality of feature templates, uses the feature presentation routines to present the automating features that achieve the result having greater generality or persistence than the desired result.

4. The system of claim 1, wherein the input device is keyboard and a mouse-type controller, and the input monitoring means detects use of both devices.

5. A method for proactively automating an operation of an application program on a general purpose computer comprising an input device, a central processing unit, a display device and memory means, said memory means including a plurality of feature templates, feature presentation and implementation routines, by automatically intervening in a user's manipulations of the input device to present automating features, said method comprising the steps of:
   continuously monitoring for the user's manipulations of the input device;
   continuously monitoring a context of an application program in which the input device is manipulated by the user;
   comparing the monitored user's manipulations of the input device and state of the application program to input information in the plurality of feature templates stored in memory and corresponding to existing features provided by the application program, to identify a result desired by the user; and
   presenting an automating feature corresponding to a feature template on the display device that achieves a result having greater generality or persistence than the identified desired result if said step of comparing produces a match between the input information of the feature template and the monitored device manipulations and application program state.

6. The method of claim 5, further comprising the step of implementing the automating feature corresponding to the matched feature template instead of the user's input device manipulations in the state of the application program.

7. The method of claim 5, wherein said steps of monitoring also record the manipulations of the input device and the state of the application program.

8. The method of claim 5, wherein said steps of monitoring, comparing and presenting are performed while the application program operates.

9. The method of claim 5, further comprising the step of selecting for presentation an automating feature that accomplishes a result that is closest to the desired result identified from the monitored manipulations of the input device.

10. The method of claim 5, further comprising the step of prioritizing a plurality of automating features for the presenting step in order of decreasing generality or persistence of the results of the automating feature if there are a plurality of templates that match the monitored manipulation of the input device, and wherein the presenting step displays the one of the plurality of automating features with the highest priority.

11. The method of claim 5, wherein the presenting step displays a plurality of features.

12. A method for checking for ambiguities and conflicts while an application program is operational on a general purpose computer comprising an input device, a central processing unit, a display device and memory means, said memory means including a plurality of feature templates, feature presentation and implementation routines, said method comprising the steps of:
   continuously monitoring and recording a first direct manipulation of an input device by a computer user and a context of the direct manipulation of the input device;
   continuously monitoring and recording a second direct manipulation of the input device in the same context;
   comparing the first and second direct manipulations and their contexts to a plurality of inconsistency templates, each of which corresponds to an inconsistency between first and second direct manipulations of the input device in a given context; and displaying the inconsistency that corresponds to one of the plurality of inconsistency templates if a match is found between the one of the plurality of inconsistency templates and the first and second direct manipulations in the comparing step.

13. The method of claim 12, further comprising the steps of:

prompting a user through the display device to resolve the inconsistency by choosing the first or second manipulations of the input device; and resolving the inconsistency by implementing the chosen first or second manipulation provided in response to the prompting step.

* * * * *